United States Patent [19]

You et al.

[11] Patent Number: 5,118,347
[45] Date of Patent: Jun. 2, 1992

[54] SOLID DRIVER FOR THE SOLID INK JET INK

[75] Inventors: Young S. You, Los Altos; Robert J. Miller, Burlingame; An-Chung R. Lin, Supertino, all of Calif.

[73] Assignee: Hewlett-Packard Company, Palo Alto, Calif.

[21] Appl. No.: 671,590

[22] Filed: Mar. 19, 1991

[51] Int. Cl.$^5$ ............................................... C09D 11/02
[52] U.S. Cl. ...................................................... 106/20
[58] Field of Search ...................................... 106/20, 22

[56] References Cited

U.S. PATENT DOCUMENTS 4,490,728 12/1984 Vaught et al. ........................ 346/1.1
5,000,786 3/1991 Matsuzaki .............................. 106/20
5,006,170 4/1991 Schwartz et al. ..................... 106/22

OTHER PUBLICATIONS

*Output Hardcopy Devices,* Chapter 13: Ink jet Printing by William J. LLoyd and Howard H. Taub., pp. 311-369.

Primary Examiner—William R. Dixon, Jr.
Assistant Examiner—Helene Klemanski

[57] ABSTRACT

A single-pulse driver for a bubble driven ink jet ink having good staying power at operating temperature, the driver being a solvent for the ink carrier, having a molecular weight less than 150, a boiling point less than 140 centigrade degrees higher than its melting point and a boiling temperature not lower than 120° centigrade.

4 Claims, No Drawings

SOLID DRIVER FOR THE SOLID INK JET INK

TECHNICAL FIELD

This invention is in the field of printing ink compositions for use in bubble driven ink jet printing processes.

BACKGROUND ART

Ink jet printing is accomplished by ejecting ink from a nozzle toward paper or other medium upon which printing is to be placed In various printing processes ink is driven from the nozzles toward the medium in different ways.

Among the ways to perform ink jet printing are electrostatic printing which is performed by driving ink from a nozzle toward a medium with an electrostatic field. Another ink jet printing procedure employs a piezo-electric element located within the ink nozzle. Electrically-caused distortions of the piezo-electric element causes it to operate in a pump-like fashion to drive the ink through the nozzle and toward the printing medium. Still another ink jet printing procedure drives ink from a nozzle and toward the printing medium by forming an expanding vapor-phase bubble behind the nozzle. The vaporizable material that forms the bubble is called the driver and the major portion of the ink that is deposited on the printing medium and forms the visible image is called the carrier. The carrier includes a colorant which is usually a dye or pigment that is dissolved or suspended in the ink and it forms the visible image on the medium Some driver material may be mixed in with the carrier when it is deposited on the paper, although in this state it no longer functions as a driver The driver and the carrier are sometimes referred to as the vehicle of the ink. Solid ink jet inks are those having carriers that are solid at room temperature. These various printing methods are described in Vaught, et al., U.S. Pat. No 4,490,728; *Output Hard Copy Devices*, edited by Durbeck and Sherr, Academic Press 1988, see particularly chapter 13 entitled Ink Jet Printing; and EPC Application No. EP0036790.

When a solid ink jet ink having a vaporizable driver is used it is common to hold a capacity of ink at a temperature that is higher than the melting temperature of the carrier, which is higher than room temperature That higher temperature is called the operating temperature and it is usually between about 70 degrees C. and 110 degrees C. depending on the melting temperature of the carrier Holding ink at the operating temperature insures that the carrier is in liquid phase and diminishes the amount of heat that must be supplied to vaporize the driver.

In order to drive the ink through the nozzle it is necessary to form a vapor phase bubble from the liquid driver The bubble is usually formed by passing the ink composition which includes the driver into contact with an electric resistance heater that is pulsed with a very short electrical pulse. This pulse rapidly raises the temperature sufficiently high to vaporize the driver in contact with the heater to well above its boiling temperature so that a great deal of superheat is added to the driver The peak temperature of the heater used to vaporize the driver is usually between 150 and 400 degrees C. but it may be different depending on the driver. When the driver in contact with the heater is at a superheated temperature it can vaporize suddenly and explosively to provide the driving force necessary to eject ink from the nozzle. The heater normally provides heat to the ink in pulses The driver may be vaporized with a single heat pulse or with multiple heat pulses The heat pulses usually have a duration between one and ten microseconds. In order for a driver to be vaporized with a single heat pulse, it must have very high volatility at temperatures near its boiling temperature. It is desirable to vaporize a driver with a single heat pulse it is a more energy-efficient mode of operation than if multiple pulses are required.

Holding ink at elevated operating temperature causes a volatile driver to evaporate more quickly than when it is held at room temperature so that the composition of the ink changes constantly. When too much driver evaporates the ink becomes viscous and more difficult to eject and there is less volatile driver available to form bubbles. When ink is held at elevated operating temperature too long successful ejection of the ink through a nozzle cannot be accomplished or the ink may form a crust so that it becomes unusable.

One necessary property of a driver is that it be a solvent for the carrier. Another necessary property of a good driver is that it be very volatile at temperatures close to its boiling temperature so that it can be vaporized easily. A very desirable quality of a driver is that it evaporate slowly when it is held at its operating temperature. In some respects the desirable qualities of a driver are inconsistent. Normally one has to trade off easy bubble forming ability for staying time at operating temperature, or vice versa.

SUMMARY OF THE INVENTION

This invention is a driver that is very volatile at the vaporizing temperature of the heater in a nozzle but one that has relatively low volatility at holding temperature whereby the ink including the driver of this invention can be maintained at holding temperature for prolonged periods of time without a significant change in its compositions or its properties and is yet easily vaporized with a single pulse at vaporizing temperature to drive ink through an ink nozzle. The driver of this invention is an organic solvent for the carrier of the ink, the driver having a molecular weight lower than about 150, and having the difference in temperature between its boiling temperature and its melting temperature not greater than 140 degrees centigrade. The volatile driver of this invention also must have a boiling temperature not lower than 120 degrees C. Drivers having the above-noted properties are extremely volatile at vaporizing temperature and relatively non-volatile at holding temperature, whereby they have good staying power at holding temperature but provide explosive vaporization to drive an ink jet ink through a nozzle using a single heating pulse.

DETAILED DESCRIPTION OF THE INVENTION

Table 1 discloses a number of drivers made in accordance with this invention. All of the drivers were used in ink jet ink compositions using a carrier consisting of stearic acid and a colorant sold by Morton Thiokol under the trademark MORFAST BLACK DYE DC. The inks contained 30% driver, 10% colorant and 60% stearic acid on a weight basis. All of the inks employing the drivers disclosed in Table 1 were used in a bubble driven ink jet printer in which the operating temperature was about 85 degrees C. and the driver was superheated and vaporized by passing the ink composition at operating temperature into direct contact with an electric resistance heater having a surface temperature of about 305 degrees C. Vaporizing was accomplished with one heat pulse of six microseconds or less.

TABLE 1

| DRIVER | BOILING POINT | MP/BP DIFF (°C.) | MW | *WT. LOSS @ 100° C. %/MIN | V.P. @ 305° C. (mm Hg) |
| --- | --- | --- | --- | --- | --- |
| Propionamide | 213 | 131 | 73 | 1.423 | 10,600 |
| Butyramide | 216 | 101 | 87 | | 10,000 |
| Isobutyramide | 216 | 89 | 87 | 0.598 | 9,700 |
| Dimethyl propanediol | 206 | 85 | 104 | 1.511 | 23,000 |
| 4-Methylbenzyl alcohol | 217 | 57 | 122 | 0.601 | 12,480 |
| 4-Isopropyl phenol | 212 | 52 | 136 | 2.286 | 10,680 |

*measured by DuPont thermal gavimetric analyzer

In the examples of Table 1 the staying power of the drivers is reported as percent weight loss per minute at operating temperature. Although different operating temperatures may be employed for different inks these examples used 100° C. as a standard, that temperature being high in the range of useful operating temperatures.

The ability of a driver to expel ink through an ink nozzle is reported as its vapor pressure at 350° C.

We claim:
1. A driver for a thermal ink jet ink comprising an organic solvent for an ink vehicle said solvent having a molecular weight less than 150, a boiling temperature not greater than 140 centrigrade degrees higher than its melting temperature, a boiling temperature not lower than 120° C., and selected from the group consisting of n-butyramide, isobutyramide and dimethyl propanediol.
2. The driver of claim 1, comprising n-butyramide.
3. The driver of claim 1, comprising isobutyramide.
4. The driver of claim 1, comprising dimethyl propanediol.

* * * * *